(12) United States Patent
Shirakawa

(10) Patent No.: US 7,475,414 B2
(45) Date of Patent: Jan. 6, 2009

(54) BROADCASTING SERVICE SYSTEM AND DELAY BROADCASTING METHOD IN BROADCASTING SERVICE USING THE BROADCASTING SERVICE SYSTEM

(75) Inventor: Takahisa Shirakawa, Tokyo (JP)

(73) Assignee: NEC Corporation, Tokyo (JP)

( * ) Notice: Subject to any disclaimer, the term of this patent is extended or adjusted under 35 U.S.C. 154(b) by 1905 days.

(21) Appl. No.: 09/824,783

(22) Filed: Apr. 4, 2001

(65) Prior Publication Data

US 2001/0029615 A1    Oct. 11, 2001

(30) Foreign Application Priority Data

Apr. 6, 2000    (JP) ............................. 2000-105079

(51) Int. Cl.
*H04N 7/16*    (2006.01)
*H04N 7/025*    (2006.01)
*G06F 3/00*    (2006.01)

(52) U.S. Cl. ............................. 725/29; 725/36; 725/42

(58) Field of Classification Search .................. 725/29, 725/36, 42
See application file for complete search history.

(56) References Cited

U.S. PATENT DOCUMENTS

| | | | |
|---|---|---|---|
| 5,539,635 A * | 7/1996 | Larson, Jr. .................. 700/234 |
| 5,572,442 A * | 11/1996 | Schulhof et al. ............ 709/219 |
| 6,029,045 A * | 2/2000 | Picco et al. .................... 725/34 |
| 6,463,585 B1 * | 10/2002 | Hendricks et al. ............. 725/35 |
| 6,588,015 B1 * | 7/2003 | Eyer et al. ..................... 725/89 |
| 7,039,599 B2 * | 5/2006 | Merriman et al. ............. 705/14 |
| 2004/0123333 A1 * | 6/2004 | Nakatsuyama ............... 725/142 |
| 2005/0028208 A1 * | 2/2005 | Ellis et al. ...................... 725/58 |
| 2007/0124794 A1 * | 5/2007 | Marko et al. ................. 725/135 |

* cited by examiner

*Primary Examiner*—Chris Kelley
*Assistant Examiner*—Franklin S Andramuno
(74) *Attorney, Agent, or Firm*—Whitham Curtis Christofferson & Cook, PC

(57) ABSTRACT

A broadcasting service system and a delay broadcasting method in broadcasting service using the broadcasting service system, any of audiovisual systems is connected to a broadcasting set when any audiovisual system request a repeater station to view program contents broadcasted by a broadcast station, and advertisement contents stored in a advertisement contents storage are broadcasted to the audiovisual systems connected to the broadcasting set. An advertisement effect measurer measures an advertisement effect on the basis of a number of the connected audiovisual systems viewing the advertisement contents and a broadcasting time of the advertisement contents and allows the broadcasting set to start of the broadcasting of the program contents to the connected audiovisual systems only when the measured advertisement effect meets a predetermined target advertisement effect. The broadcasting set rebroadcasts the program contents to the connected audiovisual systems only when the advertisement effect measurer allows the broadcasting set to start the broadcasting of the program contents.

22 Claims, 3 Drawing Sheets

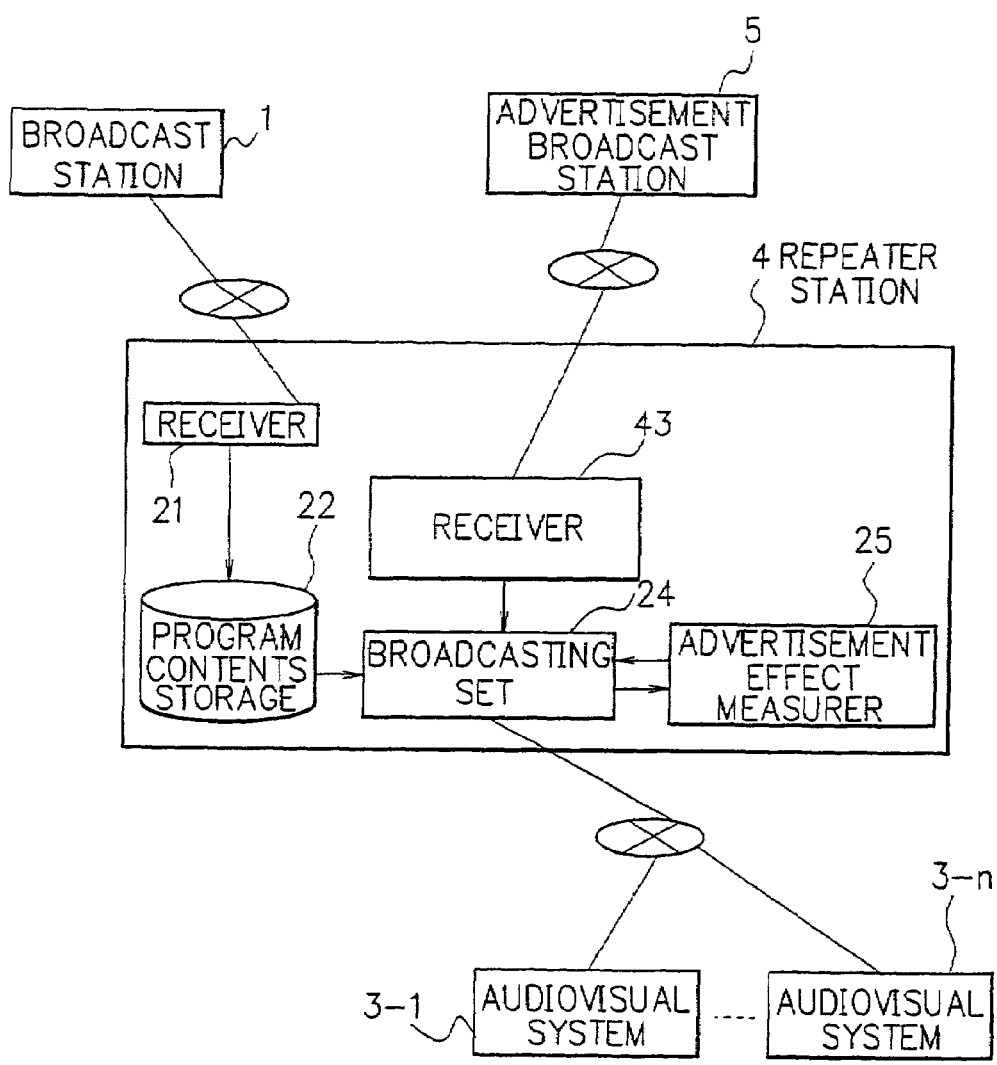

BROADCASTING SERVICE SYSTEM AND DELAY BROADCASTING METHOD IN BROADCASTING SERVICE USING THE BROADCASTING SERVICE SYSTEM

BACKGROUND OF THE INVENTION

The present invention relates to a broadcasting service system and a delay broadcasting method in broadcasting service using the broadcasting service system, which stores program contents broadcasted in a broadcast station into a repeater station and rebroadcasting the program contents to audiovisual systems requesting the repeater station to view the program contents stored therein.

DESCRIPTION OF THE PRIOR ART

In recent years, real time broadcasting service using Internet has been experimentally started in a broadcast station. The real time broadcasting service has the advantage of reducing a cost of storage means such as a HDD (hard disk drive), an optical disk drive or the like to store the program contents in the broadcast station as compared with stored broadcasting service which stores the program contents in the storage means and rebroadcasts the program contents read out of the storage means in the broadcast station.

It is predicted that small scale broadcast stations providing the real time broadcasting service using the Internet for a specific area and specialized fields will increase in number. However, the real time broadcasting service cannot be enjoyed at any time by a viewer, and, when it is inconvenient to view the real time broadcasting service at a predetermined time, the viewer is required to record the program contents of the real time broadcasting service, which increases the load of the viewer.

As described above, in the conventional real time broadcasting service, the viewer bears the increased load such as the recording of the program contents of the real time broadcasting service. Further, in the conventional stored broadcasting service, the broadcast station is burdened with the particular cost of the storage means for storing the program contents.

Hence, in recent broadcasting service, in some cases, a repeater station for storing the program contents broadcasted from the broadcast station and rebroadcasting the stored program contents has been installed. In this instance, when the cost load of the storage means such as the HDD for storing the program contents and a communications line or circuit increases in the repeater station, the broadcasting service makes no profit and thus cannot be carried on as business.

SUMMARY OF THE INVENTION

It is therefore an object of the present invention to provide a broadcasting service system in view of the aforementioned problems of the prior art, which is capable of exactly obtaining a profit in a repeater station when the repeater station rebroadcasts program contents to audiovisual systems.

It is another object of the present invention to provide a delay broadcasting method in broadcasting service using a broadcasting service system, which is capable of exactly obtaining a profit in a repeater station when the repeater station rebroadcasts program contents to audiovisual systems.

In accordance with one aspect of the present invention, there is provided a broadcasting service system comprising: a broadcast station for broadcasting program contents; at least one audiovisual systems for viewing the program contents; and a repeater station for storing the program contents broadcasted by the broadcast station and rebroadcasting the stored program contents to at least one audiovisual system making a request for viewing the program contents when at least one audiovisual system requests the repeater station to view the program contents, the repeater station connecting at least one audiovisual system in response to its request for viewing the program contents, broadcasting advertisement contents to at least one audiovisual system connected to the repeater station, measuring an advertisement effect on the basis of a number of the connected audiovisual systems viewing the advertisement contents and a broadcasting time of the advertisement contents, and rebroadcasting the program contents to the connected audiovisual systems only when the measured advertisement effect meets a predetermined target advertisement effect.

In a broadcasting service system of the present invention, the repeater station includes: a receiver for receiving the program contents broadcasted by the broadcast station; a program contents storage for storing the program contents received by the receiver; an advertisement contents storage for storing the advertisement contents; a broadcasting set for connecting at least one audiovisual system in response to its request for viewing the program contents stored in the program contents storage and broadcasting the program contents and the advertisement contents stored in the advertisement contents storage to the audiovisual systems connected to the broadcasting set; and an advertisement effect measurer for measuring an advertisement effect on the basis of the number of the connected audiovisual systems viewing the advertisement contents and the broadcasting time of the advertisement contents and allowing the broadcasting set to start the broadcasting of the program contents to the connected audiovisual systems only when the measured advertisement effect meets the predetermined target advertisement effect, the broadcasting set rebroadcasting the program contents requested by the connected audiovisual systems to the connected audiovisual systems only when the advertisement effect measurer permits the broadcasting set to start the broadcasting of the program contents.

In accordance with another object of the present invention, there is provided a broadcasting service system comprising: a broadcast station for broadcasting program contents; at least one audiovisual systems for viewing the program contents; a repeater station for storing the program contents broadcasted by the broadcast station and rebroadcasting the stored program contents to at least two audiovisual system making a request for viewing the program contents when at least one audiovisual system requests the repeater station to view the program contents; and an advertisement broadcast station for broadcasting advertisement contents, the repeater station connecting at least two audiovisual system in response to its request for viewing the program contents, broadcasting advertisement contents broadcasted by the advertisement broadcast station to at least one audiovisual system connected to the repeater station, measuring an advertisement effect on the basis of a number of the connected audiovisual systems viewing the advertisement contents and a broadcasting time of the advertisement contents, and rebroadcasting the program contents to the connected audiovisual systems only when the measured advertisement effect meets a predetermined target advertisement effect.

In a broadcasting service system of the present invention, the repeater station includes: a first receiver for receiving the program contents broadcasted by the broadcast station; a second receiver for receiving the advertisement contents broadcasted by the advertisement broadcast station; a program contents storage for storing the program contents received by the first receiver; a broadcasting set for connecting at least one audiovisual system in response to its request for viewing the program contents stored in the program contents storage and broadcasting the program contents and the advertisement contents received by the second receiver to the audiovisual systems connected to the broadcasting set; and an advertisement effect measurer for measuring an advertisement effect on the basis of the number of the connected audiovisual systems viewing the advertisement contents and the broadcasting time of the advertisement contents and allowing the broadcasting set to start the broadcasting of the program contents to the connected audiovisual systems only when the measured advertisement effect meets the predetermined target advertisement effect, the broadcasting set rebroadcasting the program contents requested by the connected audiovisual systems to the connected audiovisual systems only when the advertisement effect measurer permits the broadcasting set to start the broadcasting of the program contents.

In a broadcasting service system of the present invention, the repeater station calculates an expected waiting time until the reproadcasting of the program contents is started on the basis of the measured result of the advertisement effect and broadcasts a combination of the advertisement contents and the calculated expected waiting time on a broadcasting screen to the connected audiovisual systems.

In a broadcasting service system of the present invention, the advertisement effect measurer calculates an expected waiting time until the reproadcasting of the program contents is started on the basis of the measured result of the advertisement effect, and the broadcasting set broadcasts a combination of the advertisement contents and the expected waiting time calculated by the advertisement effect measurer on a broadcasting screen to the connected audiovisual systems.

In accordance with another object of the present invention, there is provided a broadcasting service system comprising: a broadcast station for broadcasting program contents; at least one audiovisual systems for viewing the program contents; and a repeater station for storing the program contents broadcasted by the broadcast station and rebroadcasting the stored program contents to at least one audiovisual system making a request for viewing the program contents when at least one audiovisual system requests the repeater station to view the program contents, the repeater station connecting at least one audiovisual system in response to its request for viewing the program contents, predicting whether or not a predetermined target advertisement effect can be attained within a broadcasting time of the program contents under a condition that a broadcasting of advertisement contents is inserted during a rebroadcasting of the program contents to the audiovisual systems connected to the repeater station, and rebroadcasting the program contents requested by the connected audiovisual systems to the connected audiovisual systems while inserting the broadcasting of the advertisement contents during the rebroadcasting of the program contents only when it is predicted that the predetermined target advertisement effect can be attained.

In a broadcasting service system of the present invention, the repeater station includes: a receiver for receiving the program contents broadcasted by the broadcast station; a program contents storage for storing the program contents received by the receiver; an advertisement contents storage for storing the advertisement contents; a broadcasting set for connecting at least one audiovisual system in response to its request for viewing the program contents stored in the program contents storage, and rebroadcasting the program contents requested by the audiovisual systems connected to the broadcasting set to the connected audiovisual systems while inserting the broadcasting of the advertisement contents stored in the advertisement contents storage during the rebroadcasting of the program contents; and an advertisement effect measurer for predicting whether or not a predetermined target advertisement effect can be attained within a broadcasting time of the program contents under the condition that the broadcasting of the advertisement contents is inserted during the rebroadcasting of the program contents to the connected audiovisual systems and allowing the broadcasting set to start the broadcasting of the program contents to the connected audiovisual systems only when it is predicted that the predetermined target advertisement effect can be attained, the broadcasting set rebroadcasting the program contents requested by the connected audiovisual systems to the connected audiovisual systems while inserting the broadcasting of the advertisement contents during the rebroadcasting of the program contents only when the advertisement effect measurer permits the broadcasting set to start the broadcasting of the program contents.

In accordance with another object of the present invention, there is provided a broadcasting service system comprising: a broadcast station for broadcasting program contents; at least one audiovisual systems for viewing the program contents; a repeater station for storing the program contents broadcasted by the broadcast station and rebroadcasting the stored program contents to at least one audiovisual system making a request for viewing the program contents when at least one audiovisual system requests the repeater station to view the program contents; and an advertisement broadcast station for broadcasting advertisement contents, the repeater station connecting at least one audiovisual system in response to its request for viewing the program contents, predicting whether or not a predetermined target advertisement effect can be attained within a broadcasting time of the program contents under a condition that a broadcasting of the advertisement contents broadcasted by the advertisement broadcast station is inserted during a rebroadcasting of the program contents to the audiovisual systems connected to the repeater station, and rebroadcasting the program contents requested by the connected audiovisual systems to the connected audiovisual systems while inserting the broadcasting of the advertisement contents during the rebroadcasting of the program contents only when it is predicted that the predetermined target advertisement effect can be attained.

In a broadcasting service system of the present invention, the repeater station includes: a first receiver for receiving the program contents broadcasted by the broadcast station; a second receiver for receiving the advertisement contents broadcasted by the advertisement broadcast station; a program contents storage for storing the program contents received by the first receiver; a broadcasting set for connecting at least one audiovisual system in response to its request for viewing the program contents stored in the program contents storage, and rebroadcasting the program contents requested by the audiovisual systems connected to the broadcasting set to the connected audiovisual systems while inserting the broadcasting of the advertisement contents received by the second receiver during the rebroadcasting of the program contents; and an advertisement effect measurer for predicting whether or not the predetermined target advertisement effect can be attained within the broadcasting time of the program contents under the condition that the broadcasting of the advertisement contents is inserted during the rebroadcasting of the program contents to the connected audiovisual systems, and allowing the broadcasting set to start the broadcasting of the program contents to the connected audiovisual systems only when it is predicted that the predetermined target advertisement effect can be attained, the broadcasting set rebroadcasting the program contents requested by the connected audiovisual systems to the connected audiovisual systems while inserting the broadcasting of the advertisement contents during the rebroadcasting of the program contents only when the advertisement effect measurer permits the broadcasting set to start the broadcasting of the program contents.

In accordance with another object of the present invention, there is provided a broadcasting service system comprising: a broadcast station for broadcasting program contents; at least one audiovisual systems for viewing the program contents; and a repeater station for storing the program contents broadcasted by the broadcast station and rebroadcasting the stored program contents to at least one audiovisual system making a request for viewing the program contents when at least one audiovisual system requests the repeater station to view the program contents, the repeater station connecting at least one audiovisual system in response to its request for viewing the program contents, predicting whether or not a predetermined target advertisement effect can be attained within a broadcasting time of the program contents under a condition that a combination of the program contents and advertisement contents on a broadcasting screen is rebroadcasted to the audiovisual systems connected to the repeater station, and rebroadcasting the combination of the program contents and the advertisement contents on the broadcasting screen to the connected audiovisual systems only when it is predicted that the predetermined target advertisement effect can be attained.

In a broadcasting service system of the present invention, the repeater station includes: a receiver for receiving the program contents broadcasted by the broadcast station; a program contents storage for storing the program contents received by the receiver; an advertisement contents storage for storing the advertisement contents; a broadcasting set for connecting at least one audiovisual system in response to its request for viewing the program contents stored in the program contents storage, and rebroadcasting the combination of the program contents requested by the audiovisual systems connected to the broadcasting set and the advertisement contents stored in the advertisement contents storage on the broadcasting screen to the connected audiovisual systems; and an advertisement effect measurer for predicting whether or not a predetermined target advertisement effect can be attained within the broadcasting time of the program contents under the condition that the combination of the program contents and the advertisement contents on the broadcasting screen is rebroadcasted, and allowing the broadcasting set to start the broadcasting of the program contents to the connected audiovisual systems only when it is predicted that the predetermined target advertisement effect can be attained, the broadcasting set rebroadcasting the combination of the program contents and the advertisement contents on the broadcasting screen to the connected audiovisual systems only when the advertisement effect measurer permits the broadcasting set to start the broadcasting of the program contents.

In accordance with another object of the present invention, there is provided a broadcasting service system comprising: a broadcast station for broadcasting program contents; at least one audiovisual systems for viewing the program contents; a repeater station for storing the program contents broadcasted by the broadcast station and rebroadcasting the stored program contents to at least one audiovisual system making a request for viewing the program contents when at least one audiovisual system requests the repeater station to view the program contents; and an advertisement broadcast station for broadcasting advertisement contents, the repeater station connecting at least one audiovisual system in response to its request for viewing the program contents, predicting whether or not a predetermined target advertisement effect can be attained within a broadcasting time of the program contents under a condition that a combination of the program contents and the advertisement contents broadcasted by the advertisement broadcast station on a broadcasting screen is rebroadcasted to the audiovisual systems connected to the repeater station, and rebroadcasting the combination of the program contents and the advertisement contents on the broadcasting screen to the connected audiovisual systems only when it is predicted that the predetermined target advertisement effect can be attained.

In a broadcasting service system of the present invention, the repeater station includes: a first receiver for receiving the program contents broadcasted by the broadcast station; a second receiver for receiving the advertisement contents broadcasted by the advertisement broadcast station; a program contents storage for storing the program contents received by the first receiver; a broadcasting set for connecting at least one audiovisual system in response to its request for viewing the program contents stored in the program contents storage, and rebroadcasting the combination of the program contents requested by the audiovisual systems connected to the broadcasting set and the advertisement contents received by the second receiver on the broadcasting screen to the connected audiovisual systems; and an advertisement effect measurer for predicting whether or not the predetermined target advertisement effect can be attained within the broadcasting time of the program contents under the condition that the combination of the program contents and the advertisement contents on the broadcasting screen is rebroadcasted, and allowing the broadcasting set to start the broadcasting of the program contents to the connected audiovisual systems only when it is predicted that the predetermined target advertisement effect can be attained, the broadcasting set rebroadcasting the combination of the program contents and the advertisement contents on the broadcasting screen to the connected audiovisual systems only when the advertisement effect measurer permits the broadcasting set to start the broadcasting of the program contents.

In a broadcasting service system of the present invention, the repeater station receives a plurality of programs of program contents broadcasted by the broadcast station, calculates an advertisement effect of each program of the program contents on the basis of a number of the audiovisual systems each making a request for viewing each program of the program contents, calculates a recording cost for recording each program of the program contents, calculates a proper recording time of each program of the program contents on the basis of the calculated advertisement effect and the calculated recording cost, predicts the program contents which permit to obtain the advertisement effects more than their recording costs on the basis of their calculated proper recording times, and selectively stores only the program contents predicted that the program contents permit to obtain the advertisement effects more than their recording costs.

In accordance with another object of the present invention, there is provided a delay broadcasting method in broadcasting service using a broadcasting service system comprising: a broadcast station for broadcasting program contents; at least one audiovisual systems for viewing the program contents; and a repeater station for storing the program contents broadcasted by the broadcast station and rebroadcasting the stored program contents to at least one audiovisual system making a request for viewing the program contents when at least one audiovisual system requests the repeater station to view the program contents, the repeater station connecting at least one audiovisual system in response to its request for viewing the program contents, broadcasting advertisement contents to at least one audiovisual system connected to the repeater station, measuring an advertisement effect on the basis of a number of the connected audiovisual systems viewing the advertisement contents and a broadcasting time of the advertisement contents, and rebroadcasting the program contents to the connected audiovisual systems only when the measured advertisement effect meets a predetermined target advertisement effect, comprising the steps of: connecting the repeater station to the audiovisual systems making the request for viewing the program contents; broadcasting the advertisement contents from the repeater station to the audiovisual systems connected to the repeater station; measuring the advertisement effect on the basis of the number of the connected audiovisual systems viewing the advertisement contents and the broadcasting time of the advertisement contents; discriminating whether or not the predetermined target advertisement effect can be attained on the basis of the measured result of the advertisement effect; and rebroadcasting the stored program contents requested by the connected audiovisual systems to the connected audiovisual systems when it is determined that the predetermined target advertisement effect can be attained.

In accordance with another object of the present invention, there is provided a delay broadcasting method in broadcasting service using a broadcasting service system comprising: a broadcast station for broadcasting program contents; at least one audiovisual systems for viewing the program contents; a repeater station for storing the program contents broadcasted by the broadcast station and rebroadcasting the stored program contents to at least one audiovisual system making a request for viewing the program contents when at least one audiovisual system requests the repeater station to view the program contents; and an advertisement broadcast station for broadcasting advertisement contents, the repeater station connecting at least one audiovisual system in response to its request for viewing the program contents, broadcasting advertisement contents broadcasted by the advertisement broadcast station to at least one audiovisual system connected to the repeater station, measuring an advertisement effect on the basis of a number of the connected audiovisual systems viewing the advertisement contents and a broadcasting time of the advertisement contents, and rebroadcasting the program contents to the connected audiovisual systems only when the measured advertisement effect meets a predetermined target advertisement effect, comprising the steps of: connecting the repeater station to the audiovisual systems making the request for viewing the program contents; broadcasting the advertisement contents from the repeater station to the audiovisual systems connected to the repeater station; measuring the advertisement effect on the basis of the number of the connected audiovisual systems viewing the advertisement contents and the broadcasting time of the advertisement contents; discriminating whether or not the predetermined target advertisement effect can be attained on the basis of the measured result of the advertisement effect; and rebroadcasting the stored program contents requested by the connected audiovisual systems to the connected audiovisual systems when it is determined that the predetermined target advertisement effect can be attained.

In a delay broadcasting method in broadcasting service using a broadcasting service system, further comprising the steps of: calculating the expected waiting time on the basis of the measured result of the advertisement effect until the rebroadcasting of the program contents is started; and broadcasting the combination of the advertisement contents and the expected waiting time on the broadcasting screen from the repeater system to the audiovisual systems connected to the repeater system.

In accordance with another object of the present invention, there is provided a delay broadcasting method in broadcasting service using a broadcasting service system comprising: a broadcast station for broadcasting program contents; at least one audiovisual systems for viewing the program contents; and a repeater station for storing the program contents broadcasted by the broadcast station and rebroadcasting the stored program contents to at least one audiovisual system making a request for viewing the program contents when at least one audiovisual system requests the repeater station to view the program contents, the repeater station connecting at least one audiovisual system in response to its request for viewing the program contents, predicting whether or not a predetermined target advertisement effect can be attained within a broadcasting time of the program contents under a condition that a broadcasting of advertisement contents is inserted during a rebroadcasting of the program contents to the audiovisual systems connected to the repeater station, and rebroadcasting the program contents requested by the connected audiovisual systems to the connected audiovisual systems while inserting the broadcasting of the advertisement contents during the rebroadcasting of the program contents only when it is predicted that the predetermined target advertisement effect can be attained, comprising the steps of: connecting the repeater station to the audiovisual systems making the request for viewing the program contents; predicting whether or not the predetermined target advertisement effect can be attained within the broadcasting time of the program contents under the condition that the broadcasting of the advertisement contents is inserted during the rebroadcasting of the program contents to the audiovisual systems connected to the repeater station; and rebroadcasting the program contents requested by the connected audiovisual systems to the connected audiovisual systems while inserting the broadcasting of the advertisement contents during the rebroadcasting of the program contents only when it is predicted that the predetermined target advertisement effect can be attained.

In accordance with another object of the present invention, there is provided a delay broadcasting method in broadcasting service using a broadcasting service system comprising: a broadcast station for broadcasting program contents; at least one audiovisual systems for viewing the program contents; a repeater station for storing the program contents broadcasted by the broadcast station and rebroadcasting the stored program contents to at least one audiovisual system making a request for viewing the program contents when at least one audiovisual system requests the repeater station to view the program contents; and an advertisement broadcast station for broadcasting advertisement contents, the repeater station connecting at least one audiovisual system in response to its request for viewing the program contents, predicting whether or not a predetermined target advertisement effect can be attained within a broadcasting time of the program contents under a condition that a broadcasting of the advertisement contents broadcasted by the advertisement broadcast station is inserted during a rebroadcasting of the program contents to the audiovisual systems connected to the repeater station, and rebroadcasting the program contents requested by the connected audiovisual systems to the connected audiovisual systems while inserting the broadcasting of the advertisement contents during the rebroadcasting of the program contents only when it is predicted that the predetermined target advertisement effect can be attained, comprising the steps of: connecting the repeater station to the audiovisual systems making the request for viewing the program contents; predicting whether or not the predetermined target advertisement effect can be attained within the broadcasting time of the program contents under the condition that the broadcasting of the advertisement contents broadcasted by the advertisement broadcast station is inserted during the rebroadcasting of the program contents to the audiovisual systems connected to the repeater station; and rebroadcasting the program contents requested by the connected audiovisual systems to the connected audiovisual systems while inserting the broadcasting of the advertisement contents during the rebroadcasting of the program contents only when it is predicted that the predetermined target advertisement effect can be attained.

In accordance with another object of the present invention, there is provided a delay broadcasting method in broadcasting service using a broadcasting service system comprising: a broadcast station for broadcasting program contents; at least one audiovisual systems for viewing the program contents; and a repeater station for storing the program contents broadcasted by the broadcast station and rebroadcasting the stored program contents to at least one audiovisual system making a request for viewing the program contents when at least one audiovisual system requests the repeater station to view the program contents, the repeater station connecting at least one audiovisual system in response to its request for viewing the program contents, predicting whether or not a predetermined target advertisement effect can be attained within a broadcasting time of the program contents under a condition that a combination of the program contents and advertisement contents on a broadcasting screen is rebroadcasted to the audiovisual systems connected to the repeater station, and rebroadcasting the combination of the program contents and the advertisement contents on the broadcasting screen to the connected audiovisual systems only when it is predicted that the predetermined target advertisement effect can be attained, comprising the steps of: connecting the repeater station to the audiovisual systems making the request for viewing the program contents; predicting whether or not the predetermined target advertisement effect can be attained within the broadcasting time of the program contents under the condition that the combination of the program contents requested by the audiovisual systems connected to the repeater station and advertisement contents on the broadcasting screen is rebroadcasted to the connected audiovisual systems; and rebroadcasting the combination of the program contents and the advertisement contents on the broadcasting screen to the connected audiovisual systems only when it is predicted that the predetermined target advertisement effect can be attained.

In accordance with another object of the present invention, there is provided a delay broadcasting method in broadcasting service using a broadcasting service system comprising: a broadcast station for broadcasting program contents; at least one audiovisual systems for viewing the program contents; a repeater station for storing the program contents broadcasted by the broadcast station and rebroadcasting the stored program contents to at least one audiovisual system making a request for viewing the program contents when at least one audiovisual system requests the repeater station to view the program contents; and an advertisement broadcast station for broadcasting advertisement contents, the repeater station connecting at least one audiovisual system in response to its request for viewing the program contents, predicting whether or not a predetermined target advertisement effect can be attained within a broadcasting time of the program contents under a condition that a combination of the program contents and the advertisement contents broadcasted by the advertisement broadcast station on a broadcasting screen is rebroadcasted to the audiovisual systems connected to the repeater station, and rebroadcasting the combination of the program contents and the advertisement contents on the broadcasting screen to the connected audiovisual systems only when it is predicted that the predetermined target advertisement effect can be attained, comprising the steps of: connecting the repeater station to the audiovisual systems making the request for viewing the program contents; predicting whether or not the predetermined target advertisement effect can be attained within the broadcasting time of the program contents under the condition that the combination of the program contents requested by the audiovisual systems connected to the repeater station and advertisement contents broadcasted by the advertisement broadcast station on the broadcasting screen is rebroadcasted to the connected audiovisual systems; and rebroadcasting the combination of the program contents and the advertisement contents on the broadcasting screen to the connected audiovisual systems only when it is predicted that the predetermined target advertisement effect can be attained.

In a delay broadcasting method in broadcasting service using a broadcasting service system of the present invention, the repeater station receives a plurality of programs of program contents broadcasted by the broadcast station, further comprising: calculating an advertisement effect of each program of the program contents on the basis of a number of the audiovisual systems each making a request for viewing each program of the program contents; calculating a recording cost for recording each program of the program contents; calculating a proper recording time of each program of the program contents on the basis of the calculated advertisement effect and the calculated recording cost; predicting the program contents which permit to obtain the advertisement effects more than their recording costs on the basis of their calculated proper recording times; and storing selectively only the program contents predicted that the program contents permit to obtain the advertisement effects more than their recording costs.

As described above, according to the present invention, the repeater station broadcasts the advertisement contents before the program contents are rebroadcasted, rebroadcasts the program contents only when the predetermined target advertisement effect can be attained by the broadcasting of the advertisement contents, rebroadcasts the program contents while inserting the broadcasting of the advertisement contents during the rebroadcasting of the program contents only when it is predicted that the predetermined target advertisement effect can be attained within the broadcasting time of the program contents, and rebroadcasts the combination of the program contents and the advertisement contents on the broadcasting screen only when it is predicted that the predetermined target advertisement effect can be attained within the broadcasting time of the program contents.

Hence, in the repeater station, the predetermined target advertisement effect can be exactly attained when the program contents are rebroadcasted, and thus the profit can be exactly obtained.

BRIEF DESCRIPTION OF THE DRAWINGS

The objects, features and advantages of the present invention will become more apparent from the consideration of the following detailed description, taken in conjunction with the accompanying drawings, in which:

FIG. 3 is a block diagram of a broadcasting service system according to a second embodiment of the present invention.

DESCRIPTION OF THE PREFERRED EMBODIMENTS

First Embodiment

Figure 1:
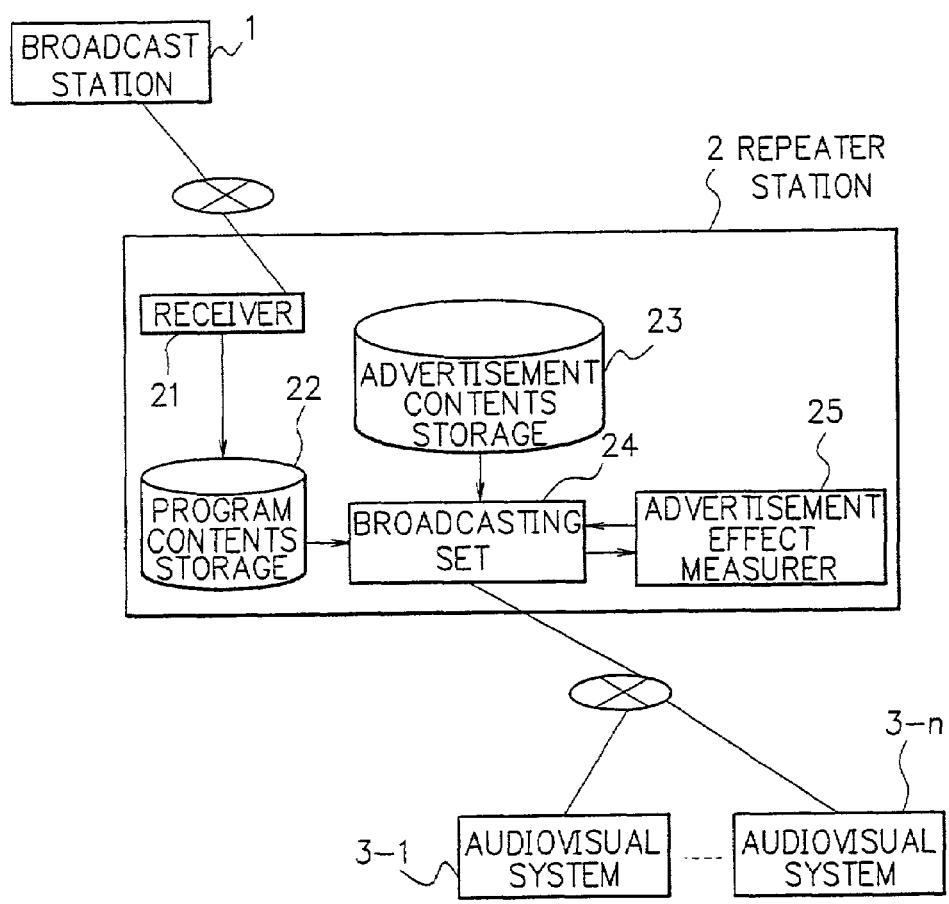
FIG. 1 is a block diagram of a broadcasting service system according to a first embodiment of the present invention.

Referring now to the drawings, there is shown in FIG. 1 that a broadcasting service system according to the first embodiment of the present invention.

As shown in FIG. 1, a broadcast station 1 for broadcasting program contents is connected to a plurality of audiovisual systems 3-1 to 3-n of viewers for viewing the program contents broadcasted from the broadcast station 1 by a repeater station 2 via a communications line or circuit. The repeater station 2 stores the program contents broadcasted by the broadcast station 1, connects to at least one audiovisual system making a request for viewing the stored program contents when at least one of the audiovisual systems 3-1 to 3-n requests the repeater station 2 to view the program contents, broadcasts advertisement contents to the audiovisual systems connected to the repeater station 2, measures an advertisement effect on the basis of a number of the connected audiovisual systems viewing the advertisement contents and a broadcasting time of the advertisement contents, and rebroadcasts the program contents to the connected audiovisual systems only when the measured advertisement effect meets a predetermined target advertisement effect.

In this embodiment, although this broadcasting service system includes only one broadcast station, however, the present invention is not restricted to this, and a plurality of broadcast stations can be included. The description will be carried out with reference to a small scale broadcast station for broadcasting one program of program contents for better understanding.

The broadcast station 1, for example, is composed of a camera, a microphone, an A-D (analog-digital) converter, a compression device, a broadcasting set and so on.

The audiovisual systems 3-1 to 3-n include e.g. a receiver, a monitor, at least one speaker, and the like.

In the broadcast service system of the present invention, various available broadcast stations and various available audiovisual systems may be used.

The repeater station 2 includes a receiver 21 for receiving program contents broadcasted by the broadcast station 1, a program contents storage 22 for storing the program contents received by the receiver 21, an advertisement contents storage 23 for storing the advertisement contents, a broadcasting set 24 which is to be connected to at least one audiovisual system making a request for viewing the stored program contents and broadcasts the advertisement contents stored in the advertisement contents storage 23 and the program contents stored in the program contents storage 22 to the audiovisual system(s) selected in the audiovisual systems 3-1 to 3-n, connected to the broadcasting set 24 in response to their request for viewing the program contents, and an advertisement effect measurer 25 for measuring the advertisement effect on the basis of the number of the connected audiovisual systems viewing the advertisement contents and the broadcasting time of the advertisement contents and allowing the broadcasting set 24 to start the broadcasting of the program contents to the audiovisual systems connected to the broadcasting set 24 only when the measured advertisement effect satisfies the predetermined target advertisement effect. When allowed to start the broadcasting of the program contents by the advertisement effect measurer 25, the broadcasting set 24 rebroadcasts the program contents to the connected audiovisual systems.

The receiver 21 can be a network card, a CPU (central processing unit) or the like. The storage such as the program contents storage 22 and the advertisement contents storage 23 can be a HDD, an optical disk drive, a flash memory or the like. The broadcasting set 24 and the advertisement effect measurer 25 are devices operated by a computer control.

The broadcasting set 24 awaits a connecting request of at least one of viewers of the audiovisual systems 3-1 to 3-n for requesting the repeater station 2 to view the program contents stored in the program contents storage 22, connects at least one audiovisual system making the connection request when at least one viewer or audiovisual system requests the repeater station 2 to view the program contents, broadcasts a combination of the advertisement contents stored in the advertisement contents storage 23 and an expected waiting time described hereinafter to at least one audiovisual system connected to the broadcasting set 24, and notifies the advertisement effect measurer 25 of an increment of the number of the viewers awaiting the viewing of the program contents.

The advertisement effect measurer 25 reads out the viewer number increment received from the broadcasting set 24 to renew the number of viewers awaiting the viewing of the program contents, measures the advertisement effect obtained by broadcasting the advertisement contents on the basis of the number of the renewed viewers viewing the advertisement contents and the broadcasting time of the advertisement contents, measures a difference between the obtained advertisement effect up to now and the predetermined target advertisement effect in business, further calculates the expected waiting time until the rebroadcasting of the program contents to the connected audiovisual systems is started after the target advertisement effect is achieved on the basis of the change of the advertisement effect up to now, and informs the broadcasting set 24 of the calculated expected waiting time.

The advertisement effect measurer 25 further discriminates whether or not the target advertisement effect is attained and sends a control signal for allowing the broadcasting set 24 to start the broadcasting of the program contents to the audiovisual systems connected to the broadcasting set 24 only when it is discriminated that the target advertisement effect is achieved.

The broadcasting set 24 detects whether or not the control signal is sent from the advertisement effect measurer 25 to the broadcasting set 24 and rebroadcasts the program contents to the connected audiovisual system(s) only when it is detected that the broadcasting set 24 receives the control signal from the advertisement effect measurer 25. When detecting not to receive the control signal, the broadcasting set 24 determines whether or not the viewers stop the viewing of the program contents, disconnects the connected audiovisual systems from the broadcasting set 24, and notifies the advertisement effect measurer 25 whether or not the number of the viewers awaiting the viewing of the program contents is reduced on the basis of the determination result.

A delay broadcasting method in broadcasting service using the broadcasting service system described above will be described in detail with reference to a flow chart shown in FIG. 2.

Figure 2:
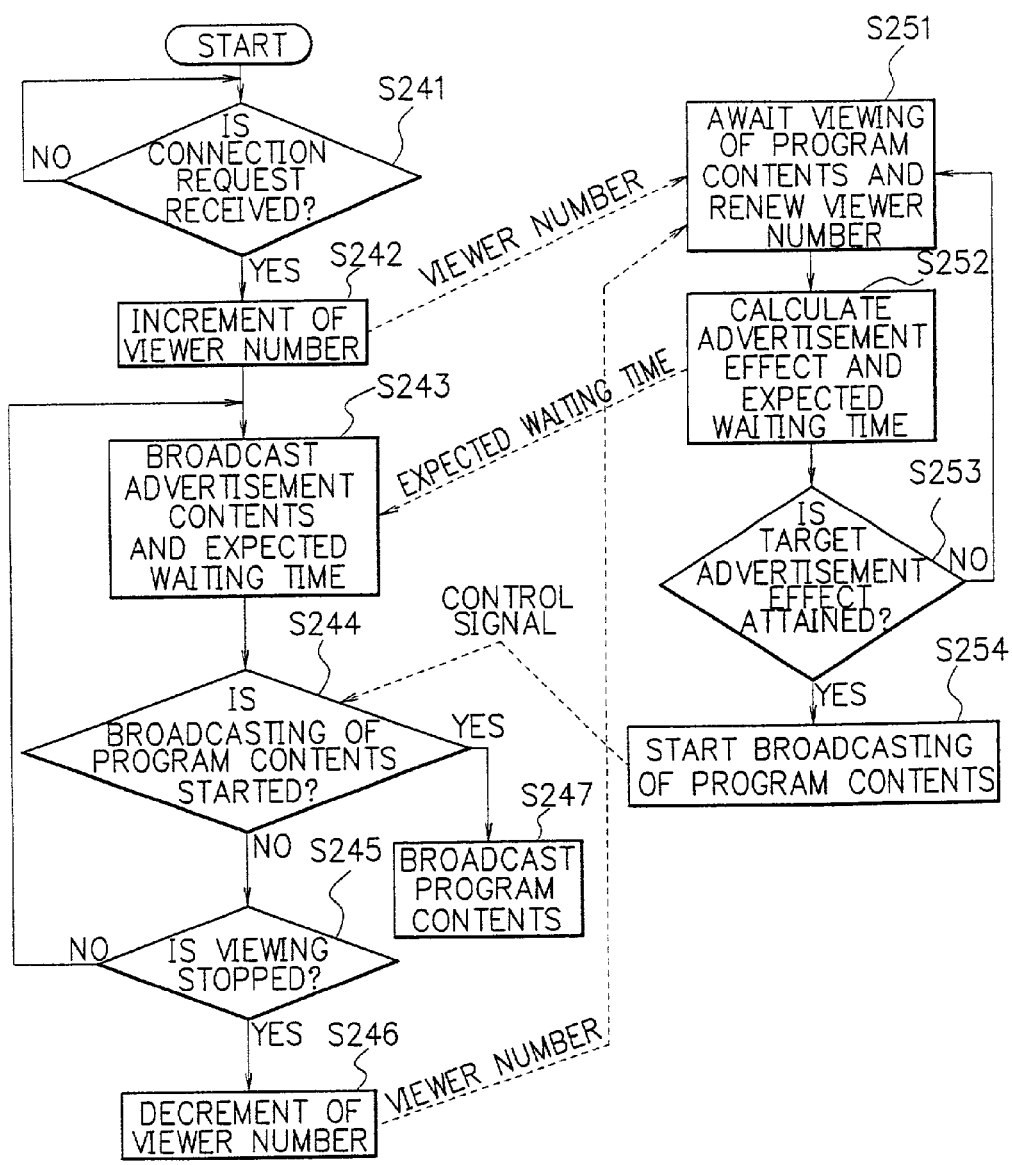
FIG. 2 is a flow chart showing a process of a delay broadcasting method in broadcasting service using the broadcasting service system shown in FIG. 1.

FIG. 2 illustrates a flow chart for explaining a process of a delay broadcasting method in broadcasting service using the broadcasting service system shown in FIG. 1. In FIG. 2, steps S241 to S247 are operated in the broadcasting set 24 and steps S251 to 254 are operated in the advertisement effect measurer 25.

In the repeater station 2, when the receiver 21 receives the program contents broadcasted by the broadcast station 1, the received program contents are stored into the program contents storage 22. The advertisement contents are previously stored in the advertisement contents storage 23.

When any of the viewers of the audiovisual systems 3-1 to 3-n missed viewing of the certain program contents broadcasted by the broadcast station 1, the viewer(s) can request the repeater station 2 to view the program contents.

At this time, in the repeater station 2, the broadcasting set 24 awaits a connection request of the viewer of the audiovisual system for requesting the repeater station 2 to view the program contents and discriminates whether or not to receive the connection request in step S241.

When the broadcasting set 24 detects that the connection request is not received in step S241, the discrimination of whether or not to receive the connection request is repeated.

On the other hand, when the broadcasting set 24 detects that the connection request is received in step S241, the broadcasting set 24 notifies the advertisement effect measurer 25 that the viewer number increases with an increment of one in step S242, connects the audiovisual systems requesting the connection request, and broadcasts the advertisement contents stored in the advertisement contents storage 23 to the audiovisual systems connected to the broadcasting set 24 in step S243. At this time, the combination of the advertisement contents and the expected waiting time up to the start of the rebroadcasting of the program contents is broadcasted.

In the repeater station 2, the advertisement effect measurer 25 reads out the viewer number increment received from the broadcasting set 24 to renew the viewer number in step S251, measures the advertisement effect obtained by broadcasting the advertisement contents on the basis of the number of the renewed viewers viewing the advertisement contents and the broadcasting time of the advertisement contents, measure the difference between the obtained advertisement effect up to now and the predetermined target advertisement effect in business, and further calculates the expected waiting time until the target advertisement effect is achieved on the basis of the change of the advertisement effect up to now in step S252. At this time, the advertisement effect measurer 25 notifies the broadcasting set 24 of the calculated expected waiting time, and the broadcasting set 24 broadcasts the combination of the expected waiting time and the advertisement contents in step S243.

Then, the advertisement effect measurer 25 discriminates whether or not the target advertisement effect is attained on the basis of the aforementioned measuring result in step S253. When the advertisement effect measurer 25 determines that the target advertisement effect is not attained, the operation is returned to step S251, and steps S251 to S253 are repeated until the target advertisement effect is achieved by the increase of the viewer number and the increase of the broadcasting time of the advertisement contents.

On the other hand, when the advertisement effect measurer 25 determines that the target advertisement effect is attained, the control signal for allowing the broadcasting set 24 to start the broadcasting of the program contents to the connected audiovisual system(s) is/are sent from the advertisement effect measurer 25 to the broadcasting set 24 in step S254.

The broadcasting set 24 discriminates whether or not to start the broadcasting of the program contents on the basis of determining whether or not the control signal is sent from the advertisement effect measurer 25 to the broadcasting set 24 in step S244, and, when determining that the start of the broadcasting of the program contents is allowed by the receipt of the control signal from the advertisement effect measurer 25 in step S244, the broadcasting set 24 rebroadcasts the stored program contents to the audiovisual systems connected to the broadcasting set 24 in step S247.

Meanwhile, when determining that the start of the broadcasting of the program contents is not allowed in step S244, the broadcasting set 24 discriminates whether or not any of the connected audiovisual systems stops the viewing of the advertisement contents in step S245. When the broadcasting set 24 discriminates that none of the connected audiovisual systems stop the viewing of the advertisement contents in step S245, the operation is returned to step S243 and the broadcasting set 24 continuously broadcasts the advertisement contents along with the expected waiting time to the connected audiovisual system.

When the broadcasting set 24 discriminates that any of the connected audiovisual systems stops the viewing of the advertisement contents and disconnects any of the connected audiovisual systems from the broadcasting set 24 in step S245, the broadcasting set 24 informs the advertisement effect measurer 25 of a decrement of the viewer number in step S246.

As described above, in this embodiment, the advertisement contents are broadcasted to the audiovisual systems connected to the broadcasting set 24 until the predetermined target advertisement effect can be obtained before the program contents broadcasted by the broadcast station 1 are rebroadcasted to the audiovisual systems connected to the broadcasting set 24, and thus the predetermined target advertisement effect can be exactly attained by broadcasting the advertisement contents to the audiovisual system(s) connected to the broadcasting set 24, thereby obtaining a profit.

Further, in this embodiment, although the present invention has been described with a broadcast station 1 of one small scale broadcast station, however, a plurality of broadcast stations can be used or a large scale broadcast station continuously broadcasting program contents can be used. In these cases, a plurality of programs of program contents are broadcasted and the repeater station 2 receives a plurality of the programs of the program contents at the same time.

In such cases, in the repeater station 2, a plurality of requests for a plurality of programs of program contents can be made. That is, each advertisement effect of each program of the program contents is calculated on the basis of each request of each viewing of each of a plurality of the programs of the program contents, and a recording cost for storing each program of the program contents is also calculated. Further, an optimum proper recording time of each program of the program contents is calculated on the basis of the calculated advertisement effect and the calculated recording cost. Then, the program contents which permit to obtain the advertisement effects more than their recording costs on the basis of their calculated proper recording times can be predicted, and only such predicted program contents may be selectively stored in the program contents storage 22.

In these cases, in the repeater station 2, even when a plurality of the programs of the program contents are received, only the program contents permitting to make the profit exactly can be stored.

Second Embodiment

Next, a broadcasting service system according to the second embodiment of the present invention will be described in detail in connection with FIG. 3 wherein like reference characters designate like or corresponding parts shown in FIG. 1 and thus the repeated description thereof can be omitted.

In FIG. 3, there is shown a broadcasting service system according to the second embodiment of the present invention. As shown in FIG. 3, a broadcast station 1 for broadcasting program contents and an advertisement broadcast station 5 for broadcasting advertisement contents are connected to a plurality of audiovisual systems 3-1 to 3-n of viewers for viewing the program contents and the advertisement contents broadcasted from the broadcast station 1 and the advertisement broadcast station 5, respectively, via a repeater station 4. The repeater station 4 stores the program contents broadcasted by the broadcast station 1, connects to at least one audiovisual system making a request for viewing the stored program contents when at least one of the audiovisual systems 3-1 to 3-n requests the repeater station 2 to view the stored program contents, broadcasts advertisement contents broadcasted from the advertisement broadcast station 5 to at least one audiovisual system connected to the repeater station 4, measures an advertisement effect on the basis of a number of the viewers or the connected audiovisual systems viewing the advertisement contents and a broadcasting time of the advertisement contents, and rebroadcasts the program contents to the connected audiovisual systems only when the measured advertisement effect meets a predetermined target advertisement effect.

In this embodiment, the repeater station 4 includes a receiver 21 as a first receiver, another receiver 43 as a second receiver, a program contents storage 22, a broadcasting set 24 and an advertisement effect measurer 25. As compared with the repeater station 2 of the first embodiment shown in FIG. 1, the repeater station 4 is provided with the receiver 43 for receiving the advertisement contents broadcasted by the advertisement broadcast station 5 instead of the advertisement contents storage 23 of the first embodiment. Hence, in this embodiment, a delay broadcasting method in broadcasting service using this broadcasting service system can be carried out in the same manner as described above in connection with FIG. 2.

As described above, in this embodiment, a cost of a storage for storing the advertisement contents can be eliminated in the repeater station 4, and advertisers or sponsors of the advertisement broadcast station 5 can carry out a real time control of the advertisement contents. Hence, further advertising advantages can be obtained.

According to the present invention, although the rebroadcasting of the program contents is started after the predetermined target advertisement effect is attained in the first and second embodiments, however, the advertisement effect measurer 25 predicts whether or not a predetermined target advertisement effect can be obtained within a time of a broadcasting of program contents under the condition that a broadcasting of advertisement contents is inserted during a rebroadcasting of the program contents or that a combination of program contents and advertisement contents on a broadcasting screen is rebroadcasted, and, when the advertisement effect measurer 25 predicts that the predetermined target advertisement effect can be obtained under the above-described condition, the broadcasting set 24 may start the rebroadcasting of the program contents under the above-described condition.

In the broadcasting service system having such a configuration, the viewers will not continuously view only the advertisement contents for a long time, and the repeater station can improve a sponsor collecting power and an advertisement income.

As described above, the advertisement contents are broadcasted to the connected audiovisual systems and the program contents are rebroadcasted to the connected audiovisual systems only when the predetermined target advertisement effect can be attained by the broadcasting of the advertisement contents, and further, only when it is predicted that the predetermined target advertisement effect can be attained within the time of the broadcasting of the program contents, the broadcasting of the advertisement contents is inserted during the rebroadcasting of the program contents while rebroadcasting the program contents to the connected audiovisual systems, or the combination of the program contents and the advertisement contents on the broadcasting screen is rebroadcasted. Accordingly, the predetermined target advertisement effect can be exactly attained when the program contents are rebroadcasted to the connected audiovisual systems, and thus the profit can be exactly obtained.

In particular, in the case that the broadcasting of the advertisement contents is inserted during the rebroadcasting of the program contents while rebroadcasting the program contents to the connected audiovisual systems, or that the combination of the program contents and the advertisement contents on the broadcasting screen is rebroadcasted, the viewers of the audiovisual systems will not continuously view only the advertisement contents for a long time, and the repeater station can improve the sponsor collecting power and the advertisement income.

Further, in the broadcasting service system including the advertisement station for broadcasting the advertisement contents which are to be broadcasted to the audiovisual systems in the repeater station, the cost of the storage for storing the advertisement contents can be eliminated and the sponsors of the advertisement broadcast station can carry out the real time control of the advertisement contents. Hence, the further advertising advantages can be obtained.

In the repeater station wherein a plurality of programs of the program contents are received, only the program contents predicted that the program contents permit to obtain the advertisement effects more than their recording costs for storing the program contents can be selectively stored in the program contents storage and only the program contents permitting to make the profit exactly can be stored.

The broadcast station need not store the program contents and thus can reduce the storage for storing the program contents and the cost thereof.

The viewers of the audiovisual systems cannot be tied to the time of the real time broadcasting and can view the requested program contents at any time. Also, the viewers need not record the program contents of the real time broadcasting and can reduce the load of the recording of the program contents.

The repeater station can bear only the cost of the right for rebroadcasting the program contents broadcasted by the broadcast station, the cost for storing the program contents and the cost for using the communications line or circuit and thus need not bear a large cost for producing the program contents, with the result of saving the large cost.

While the present invention has been described with reference to the particular illustrative embodiments, it is not to be restricted by those embodiments but only by the appended claims. It is to be appreciated that those skilled in the art can change or modify the embodiments without departing from the scope and spirit of the present invention.

What is claimed is:

1. A broadcasting service system comprising:

a broadcast station for broadcasting a program content;

at least one audiovisual system for generating a request for viewing the program content, for selectively viewing a broadcast advertisement content, and for viewing a rebroadcast program content; and a repeater station for storing the program content broadcasted by the broadcast station and for conditionally rebroadcasting the stored program content to at least one audiovisual system making a request for viewing the program content in response to at least one audiovisual system generating the request to view the program content, wherein the repeater station conditional rebroadcasting includes connecting audiovisual systems in response to its generated request for viewing the program content, and broadcasting the advertisement content to the connected audiovisual systems, wherein the repeater station conditional rebroadcasting further includes detecting the number of the connected audiovisual systems viewing the advertisement content and generating an advertisement effect measurement based on the detected number and a broadcasting time of the advertisement content, and wherein the repeater station conditional rebroadcasting further includes comparing the advertising effect measurement to a predetermined target advertising effects and, if the advertising effect measurement meets the predetermined target advertising effect, to rebroadcast the stored program content to the connected audiovisual systems, and, if advertisement effect measurement fails to meet the predetermined target advertisement effect, to not rebroadcast the stored program content to the connected audiovisual systems.

2. The broadcasting service system of claim 1, wherein the repeater station conditional rebroadcasting further includes calculating an expected waiting time until the rebroadcasting of the program content is started, based on the measured result of the advertisement effect, and is arranged to broadcast a combination of the advertisement content and the calculated expected waiting time to the connected audiovisual systems.

3. The broadcasting service system of claim 1, wherein the broadcast station is for broadcasting a plurality of program contents;

wherein the repeater station conditional rebroadcasting further includes receiving the plurality of program contents broadcasted by the broadcast station, wherein the repeater station conditional rebroadcasting further includes calculating an advertisement effect of each of the program contents on the basis of a number of the audiovisual systems generating a request for viewing each of said plurality of program contents, wherein the repeater station conditional rebroadcasting further includes calculating a recording cost for recording each of the program contents, wherein the repeater station conditional rebroadcasting further includes calculating a proper recording time of each program of the program contents based on the calculated advertisement effect and the calculated recording cost, wherein the repeater station conditional rebroadcasting further includes generating a prediction indicating which from among the program contents will have advertisement effects exceeding their recording costs on the basis of their calculated proper recording times, and wherein the repeater station conditional rebroadcasting further includes selectively storing only the program contents for which the generated prediction indicates advertisement effects exceeding their recording costs.

4. A broadcasting service system comprising:

a broadcast station for broadcasting a program content;

at least one audiovisual system for generating a request for viewing the program content, for selectively viewing a broadcast advertisement content, and for viewing a rebroadcast program content; and a repeater station for storing the program content broadcasted by the broadcast station and for conditionally rebroadcasting the stored program content to at least one audiovisual system making a request for viewing the program content in response to at least one audiovisual system generating the request to view the program content, wherein the repeater station includes:

a receiver for receiving the program content broadcasted by the broadcast station;

a program content storage for storing the program content received by the receiver;

an advertisement content storage for storing an advertisement content;

a broadcasting set for connecting said audiovisual systems in response to its generated request for viewing the program content, and for broadcasting the advertisement content stored in the advertisement content storage to the audiovisual systems connected to the broadcasting set; and an advertisement effect measurer for detecting the number of the connected audiovisual systems viewing the advertisement content and for generating an advertisement effect measurement based on the detected number and on the broadcasting time of the advertisement content, wherein the advertisement effect measurer controls the broadcasting set to rebroadcast the stored program content based on the generated advertisement effect measurement, to start rebroadcasting of the stored program content to the connected audiovisual systems if the advertising effect measurement meets the predetermined target advertising effect, and, if the advertisement effect measurement fails to meet the predetermined target advertisement effect, to not rebroadcast the stored program content to the connected audiovisual systems.

5. The broadcasting service system of claim 4, wherein the advertisement effect measurer further calculates an expected waiting time until the rebroadcasting of the program content is started, based on the advertisement effect measurement, and wherein the broadcasting set broadcasts a combination of the advertisement content and the expected waiting time calculated by the advertisement effect measurer to the broadcasting screen of the connected audiovisual systems.

6. A broadcasting service system comprising:

a broadcast station for broadcasting a program content;

at least one audiovisual system for generating a request for viewing the program content, for selectively viewing a broadcast advertisement content, and for viewing a rebroadcast program content; and a repeater station for storing the program content broadcasted by the broadcast station and for conditionally rebroadcasting the stored program content to at least one audiovisual system making a request for viewing the program content in response to at least one audiovisual system generating the request to view the program content; and an advertisement broadcast station for broadcasting the advertisement content, wherein the repeater station conditional rebroadcasting includes connecting at least one audiovisual system in response to its generated request for viewing the program content, and includes broadcasting the advertisement content to the connected audiovisual systems, wherein the repeater station conditional rebroadcasting includes detecting the number of the connected audiovisual systems viewing the advertisement content and includes generating an advertisement effect measurement based on the detected number and on the broadcasting time of the advertisement content, and wherein the repeater station conditional rebroadcasting further includes comparing the advertising effect measurement to a predetermined target advertising effects and, if the advertising effect measurement meets the predetermined target advertising effect, to rebroadcast the stored program content to the connected audiovisual systems, and, if the advertisement effect measurement fails to meet the predetermined target advertisement effect, to not rebroadcast the stored program content to the connected audiovisual systems.

7. The broadcasting service system of claim 6, wherein the repeater station conditional rebroadcasting includes calculating an expected waiting time until the rebroadcasting of the program content is started, based on the advertisement effect measurement, and further includes broadcasting a combination of the advertisement content and the calculated expected waiting time to the connected audiovisual systems.

8. The broadcasting service system of claim 6, wherein the broadcast station is for broadcasting a plurality of program contents, wherein the repeater station conditional rebroadcasting further includes receiving the plurality of program contents broadcasted by the broadcast station, wherein the repeater station conditional rebroadcasting further includes calculating an advertisement effect of each program of the program contents on the basis of a number of the audiovisual systems generating a request for viewing each of said plurality of program contents, wherein the repeater station conditional rebroadcasting further includes calculating a recording cost for recording each of the program contents, wherein the repeater station conditional rebroadcasting further includes calculating a proper recording time of each program of the program contents based on the calculated advertisement effect and the calculated recording cost, wherein the repeater station conditional rebroadcasting further includes generating a prediction indicating which from among the program contents will have advertisement effects exceeding their recording costs on the basis of their calculated proper recording times, and wherein the repeater station conditional rebroadcasting further includes selectively storing only the program contents for which the generated prediction indicates advertisement effects exceeding their recording costs.

9. A broadcasting service system comprising:

a broadcast station for broadcasting a program content;

at least one audiovisual system for generating a request for viewing the program content, for selectively viewing a broadcast advertisement content, and for viewing a rebroadcast program content;

a repeater station for storing the program content broadcasted by the broadcast station and for conditionally rebroadcasting the stored program content to at least one audiovisual system making a request for viewing the program content in response to at least one audiovisual system generating the request to view the program content; and an advertisement broadcast station for broadcasting the advertisement content, wherein the repeater station includes:

a first receiver for receiving the program content broadcasted by the broadcast station;

a second receiver for receiving the advertisement content broadcasted by the advertisement broadcast station;

a program content storage for storing the program content received by the first receiver;

a broadcasting set for connecting at least one audiovisual system in response to its request for viewing the program content stored in the program content storage and broadcasting the program content and the advertisement content received by the second receiver to the audiovisual systems connected to the broadcasting set; and an advertisement effect measurer for detecting the number of the connected audiovisual systems viewing the advertisement content and for generating an advertisement effect measurement based on the detected number, wherein the advertisement effect measurer controls the broadcasting set to rebroadcast the program content requested by the connected audiovisual systems to the connected audiovisual systems if the advertising effect measurement meets the predetermined target advertising effect, and, if the advertisement effect measurement fails to meet the predetermined target advertisement effect, to not rebroadcast the stored program content to the connected audiovisual systems.

10. The broadcasting service system of claim 9, wherein the advertising effect measurer calculates an expected waiting time until the rebroadcasting of the program content is started, based on the measured advertisement effect, and wherein the broadcasting set broadcasts a combination of the advertisement content and the calculated expected waiting time to the connected audiovisual systems.

11. A broadcasting service system comprising: a broadcast station for broadcasting a program content;

at least one audiovisual system for generating a request for viewing the program content, for selectively viewing a broadcast advertisement content, and for viewing a rebroadcast program content; and a repeater station for storing the program content broadcasted by the broadcast station and for conditionally rebroadcasting the stored program content to at least one audiovisual system making a request for viewing the program content in response to at least one audiovisual system generating the request to view the program content, wherein the repeater station conditional rebroadcasting includes connecting at least one audiovisual system in response to its generated request for viewing the program content, wherein the repeater station conditional rebroadcasting includes generating a prediction of whether or not a predetermined target advertisement effect can be attained within a broadcasting time of the program content under a condition that a broadcasting of a given advertising content is inserted during a rebroadcasting of the program content requested by the connected audiovisual systems to the audiovisual systems connected to the repeater station, and wherein the repeater station conditional rebroadcasting includes rebroadcasting the program content requested by the connected audiovisual systems to the connected audiovisual systems while inserting the broadcasting of the advertisement content during the rebroadcasting of the program content if the prediction indicates that the predetermined target advertisement effect can be attained, and wherein the repeater station conditional rebroadcasting includes not rebroadcasting the program content requested by the connected audiovisual systems to the connected audiovisual systems if the prediction indicates that the predetermined target advertisement effect cannot be attained.

12. The broadcasting service system of claim 11, wherein the repeater station includes:

a receiver for receiving the program content broadcasted by the broadcast station;

a program content storage for storing the program content received by the receiver;

an advertisement content storage for storing the advertisement content;

a broadcasting set for connecting at least one audiovisual system in response to its request for viewing the program content stored in the program content storage, and rebroadcasting the program content requested by the audiovisual systems connected to the broadcasting set to the connected audiovisual systems while inserting the broadcasting of the advertisement content stored in the advertisement content storage during the rebroadcasting of the program content; and an advertisement effect measurer for generating said prediction of whether or not a predetermined target advertisement effect can be attained within a broadcasting time of the program content under the condition that the broadcasting of the advertisement content is inserted during the rebroadcasting of the program content to the connected audiovisual systems.

13. The broadcasting service system of claim 11, wherein the broadcast station is for broadcasting a plurality of program contents, wherein the repeater station conditional rebroadcasting further includes receiving the plurality of program contents broadcasted by the broadcast station, wherein the repeater station conditional rebroadcasting further includes calculating an advertisement effect of each program of the program contents on the basis of a number of the audiovisual systems generating a request for viewing each of said plurality of program contents, wherein the repeater station conditional rebroadcasting further includes calculating a recording cost for recording each of the program contents, wherein the repeater station conditional rebroadcasting further includes calculating a proper recording time of each program of the program contents based on the calculated advertisement effect and the calculated recording cost, wherein the repeater station conditional rebroadcasting further includes generating a prediction indicating which from among the program contents will have advertisement effects exceeding their recording costs on the basis of their calculated proper recording times, and wherein the repeater station conditional rebroadcasting further includes selectively storing only the program contents for which the generated prediction indicates advertisement effects exceeding their recording costs.

14. A broadcasting service system comprising:

a broadcast station for broadcasting a program content;

at least one audiovisual system for generating a request for viewing the program content, for selectively viewing a broadcast advertisement content, and for viewing a rebroadcast program content; and a repeater station for storing the program content broadcasted by the broadcast station and for conditionally rebroadcasting the stored program content to at least one audiovisual system making a request for viewing the program content in response to at least one audiovisual system generating the request to view the program content; and an advertisement broadcast station for broadcasting the advertisement content, wherein the repeater station conditional rebroadcasting includes connecting at least one audiovisual system in response to its generated request for viewing the program content, wherein the repeater station conditional rebroadcasting includes generating a prediction of whether or not a predetermined target advertisement effect can be attained within a broadcasting time of the program content under a condition that a broadcasting of given advertising content is inserted during a rebroadcasting of the program content requested by the connected audiovisual systems to the audiovisual systems connected to the repeater station, and wherein the repeater station conditional rebroadcasting includes rebroadcasting the program content requested by the connected audiovisual systems to the connected audiovisual systems while inserting the broadcasting of the advertisement content during the rebroadcasting of the program content if the generated prediction indicates that the predetermined target advertisement effect can be attained, and wherein the repeater station conditional rebroadcasting includes not rebroadcasting the program content requested by the connected audiovisual systems to the connected audiovisual systems if the generated prediction indicates that the predetermined target advertisement effect cannot be attained.

15. The broadcasting service system of claim 14, wherein the repeater station includes:

a first receiver for receiving the program content broadcasted by the broadcast station;

a second receiver for receiving the advertisement content broadcasted by the advertisement broadcast station;

a program content storage for storing the program content received by the first receiver;

a broadcasting set for connecting at least one audiovisual system in response to its request for viewing the program content stored in the program content storage, and rebroadcasting the program content requested by the audiovisual systems connected to the broadcasting set to the connected audiovisual systems while inserting the broadcasting of the advertisement content received by the second receiver during the rebroadcasting of the program content; and an advertisement effect measurer for generating the prediction of whether or not the predetermined target advertisement effect can be attained within the broadcasting time of the program content under the condition that the broadcasting of the advertisement content is inserted during the rebroadcasting of the program content to the connected audiovisual systems.

16. The broadcasting service system of claim 14, wherein the broadcast station is for broadcasting a plurality of program contents, wherein the repeater station conditional rebroadcasting further includes receiving the plurality of program contents broadcasted by the broadcast station, wherein the repeater station conditional rebroadcasting further includes calculating an advertisement effect of each program of the program contents on the basis of a number of the audiovisual systems generating a request for viewing each of said plurality of program contents, wherein the repeater station conditional rebroadcasting further includes calculating a recording cost for recording each of the program contents, wherein the repeater station conditional rebroadcasting further includes calculating a proper recording time of each program of the program contents based on the calculated advertisement effect and the calculated recording cost, wherein the repeater station conditional rebroadcasting further includes generating a prediction indicating which from among the program contents will have advertisement effects exceeding their recording costs on the basis of their calculated proper recording times, and wherein the repeater station conditional rebroadcasting further includes selectively storing, based on said generated prediction, only the program contents for which the generated prediction indicates advertisement effects exceeding their recording costs.

17. A broadcasting service system comprising:

a broadcast station for broadcasting program content;

at least one audiovisual system for generating a request for viewing the program content, for selectively viewing a broadcast advertisement content, and for viewing a rebroadcast program content; and a repeater station for storing the program content broadcasted by the broadcast station and for conditionally rebroadcasting the stored program content to at least one audiovisual system making a request for viewing the program content in response to at least one audiovisual system generating the request to view the program content, wherein the repeater station conditional rebroadcasting includes generating a prediction indicating whether or not a predetermined target advertisement effect can be attained within a broadcasting time of the program content under a condition that a broadcasting of given advertising content is inserted during a rebroadcasting of the program content requested by the connected audiovisual systems to the audiovisual systems connected to the repeater station, and wherein the repeater station conditional rebroadcasting includes rebroadcasting the program content requested by the connected audiovisual systems to the connected audiovisual systems while inserting the broadcasting of the advertisement content during the rebroadcasting of the program content if the generated prediction indicates that the predetermined target advertisement effect can be attained, and wherein the repeater station conditional rebroadcasting includes not rebroadcasting the program content requested by the connected audiovisual systems to the connected audiovisual systems if the generated prediction indicates that the predetermined target advertisement effect cannot be attained.

18. The broadcasting service system of claim 17, wherein the repeater station includes:

a receiver for receiving the program content broadcasted by the broadcast station;

a program content storage for storing the program content received by the receiver;

an advertisement content storage for storing the advertisement content;

a broadcasting set for connecting at least one audiovisual system in response to its request for viewing the program content stored in the program content storage, and rebroadcasting the combination of the program content requested by the audiovisual systems connected to the broadcasting set and the advertisement content stored in the advertisement content storage on the broadcasting screen to the connected audiovisual systems; and an advertisement effect measurer for generating the prediction indicating whether or not a predetermined target advertisement effect can be attained within the broadcasting time of the program content under the condition that the combination of the program content and the advertisement content on the broadcasting screen is rebroadcasted, wherein the advertisement effect measurer controls the broadcasting set to rebroadcast the combination of the program content and the advertisement content on the broadcasting screen to the connected audiovisual systems only when the prediction generated by the advertisement effect measurer indicates that the predetermined target advertisement effect can be attained within the broadcasting time of the program content under said condition.

19. The broadcasting service system of claim 17, wherein the broadcast station is for broadcasting a plurality of program contents, wherein the repeater station conditional rebroadcasting further includes receiving the plurality of program contents broadcasted by the broadcast station, wherein the repeater station conditional rebroadcasting further includes calculating an advertisement effect of each program of the program contents on the basis of a number of the audiovisual systems generating request for viewing each of said plurality of program contents, wherein the repeater station conditional rebroadcasting further includes calculating a recording cost for recording each of the program contents, wherein the repeater station conditional rebroadcasting further includes calculating a proper recording time of each program of the program contents based on the calculated advertisement effect and the calculated recording cost, wherein the repeater station conditional rebroadcasting further includes generating a prediction indicating which from among the program contents will have advertisement effects exceeding their recording costs on the basis of their calculated proper recording times, and wherein the repeater station conditional rebroadcasting further includes selectively storing, based on said generated prediction, only the program contents for which the generated prediction indicates advertisement effects exceeding their recording costs.

20. A broadcasting service system comprising:

a broadcast station for broadcasting program content;

at least one audiovisual system for generating a request for viewing the program content, for selectively viewing a broadcast advertisement content, and for viewing a rebroadcast program content; and a repeater station for storing the program content broadcasted by the broadcast station and for conditionally rebroadcasting the stored program content to at least one audiovisual system making a request for viewing the program content in response to at least one audiovisual system generating the request to view the program content; and an advertisement broadcast station for broadcasting advertisement content, wherein the repeater station conditional rebroadcasting includes connecting at least one audiovisual system in response to its request for viewing the program content, wherein the repeater station conditional rebroadcasting includes generating a prediction indicating whether or not a predetermined target advertisement effect can be attained within a broadcasting time of the program content under a condition that a combination of the program content and the advertisement content broadcasted by the advertisement broadcast station on a broadcasting screen is rebroadcasted to the audiovisual systems connected to the repeater station, wherein the repeater station conditional rebroadcasting includes rebroadcasting the combination of the program content and the advertisement content on the broadcasting screen to the connected audiovisual systems if the generated prediction indicates that the predetermined target advertisement effect can be attained, and wherein the repeater station conditional rebroadcasting includes not rebroadcasting the combination of the program content and the advertisement content on the broadcasting screen to the connected audiovisual systems if the generated prediction indicates that the predetermined target advertisement effect cannot be attained.

21. The broadcasting service system of claim 20, wherein the repeater station includes:

a first receiver for receiving the program content broadcasted by the broadcast station;

a second receiver for receiving the advertisement content broadcasted by the advertisement broadcast station;

a program content storage for storing the program content received by the first receiver;

a broadcasting set for connecting at least one audiovisual system in response to its request for viewing the program content stored in the program content storage, and rebroadcasting the combination of the program content requested by the audiovisual systems connected to the broadcasting set and the advertisement content received by the second receiver on a broadcasting screen of the connected audiovisual systems; and an advertisement effect measurer for generating the prediction indicating whether or not the predetermined target advertisement effect can be attained within the broadcasting time of the program content under the condition that the combination of the program content and the advertisement content on the broadcasting screen is rebroadcasted, wherein the advertisement effect measurer controls the broadcasting set to rebroadcast the combination of the program content and the advertisement content on the broadcasting screen to the connected audiovisual systems only when the advertisement effect measurer generates a prediction indicating the predetermined target advertisement effect can be attained.

22. The broadcasting service system of claim 20, wherein the broadcast station is for broadcasting a plurality of program contents, wherein the repeater station conditional rebroadcasting further includes receiving the plurality of program contents broadcasted by the broadcast station, wherein the repeater station conditional rebroadcasting further includes calculating an advertisement effect of each program of the program contents on the basis of a number of the audiovisual systems generating a request for viewing each of said plurality of program contents, wherein the repeater station conditional rebroadcasting further includes calculating a recording cost for recording each of the program contents, wherein the repeater station conditional rebroadcasting further includes calculating a proper recording time of each program of the program contents based on the calculated advertisement effect and the calculated recording cost, wherein the repeater station conditional rebroadcasting further includes generating a prediction indicating which from among the program contents will have advertisement effects exceeding their recording costs on the basis of their calculated proper recording times, and wherein the repeater station conditional rebroadcasting further includes selectively storing, based on said generated prediction, only the program contents for which the generated prediction indicates advertisement effects exceeding their recording costs.

\* \* \* \* \*